United States Patent
Oh et al.

(10) Patent No.: US 8,181,248 B2
(45) Date of Patent: May 15, 2012

(54) SYSTEM AND METHOD OF DETECTING ANOMALY MALICIOUS CODE BY USING PROCESS BEHAVIOR PREDICTION TECHNIQUE

(75) Inventors: HyungGeun Oh, Taejon (KR); Seung-Hyun Paek, Taejon (KR); Cheolho Lee, Gyeonggi-do (KR); DoHoon Lee, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 792 days.

(21) Appl. No.: 11/944,268

(22) Filed: Nov. 21, 2007

(65) Prior Publication Data
US 2008/0127346 A1 May 29, 2008

(30) Foreign Application Priority Data

Nov. 23, 2006 (KR) .................. 10-2006-0116572
Oct. 5, 2007 (KR) .................. 10-2007-0100391

(51) Int. Cl.
*G08B 23/00* (2006.01)
*H04L 29/06* (2006.01)
*H04L 9/32* (2006.01)
*G06F 12/14* (2006.01)
*G06F 15/173* (2006.01)

(52) U.S. Cl. .............. 726/23; 726/24; 726/25; 713/165; 713/166; 713/168; 713/187; 713/188; 713/189; 709/224

(58) Field of Classification Search .............. 726/23–25; 713/165, 166, 168, 187–189; 709/224
See application file for complete search history.

(56) References Cited

U.S. PATENT DOCUMENTS

| | | | |
|---|---|---|---|
| 7,181,768 B1* | 2/2007 | Ghosh et al. ............. | 726/23 |
| 2006/0053490 A1* | 3/2006 | Herz et al. ............. | 726/23 |
| 2007/0283436 A1* | 12/2007 | Duffield et al. ............. | 726/23 |
| 2009/0288156 A1* | 11/2009 | Sharp et al. ............. | 726/11 |

* cited by examiner

*Primary Examiner* — Aravind Moorthy
(74) *Attorney, Agent, or Firm* — Rabin & Berdo, P.C.

(57) ABSTRACT

Provided are a pattern analyzing/detecting method and a system using the same that are capable of detecting and effectively preventing an unknown malicious code attack. To detect such an attack, the method monitors the system to combine all behaviors exhibited within the system due to corresponding malicious codes, reprocess and learn the behaviors, analyze existing malicious behavior feature values (prediction patterns), and compare them with a behavior pattern exhibited by an execution code.

11 Claims, 4 Drawing Sheets

SYSTEM AND METHOD OF DETECTING ANOMALY MALICIOUS CODE BY USING PROCESS BEHAVIOR PREDICTION TECHNIQUE

BACKGROUND OF THE INVENTION

1. Field of the Invention

The present invention relates to a pattern analyzing/detecting method and a system using the same that are capable of detecting and effectively preventing an unknown malicious code attack. To detect such an attack, the method monitors the system to combine all behaviors exhibited within the system due to corresponding malicious codes, reprocess and learn the behaviors, analyze existing malicious behavior feature values (prediction patterns), and compare them with a behavior pattern exhibited by an execution code.

2. Description of the Related Art

As dependency on information and communication technology increases, electronic intrusion and cyber-terrorism that take advantage of vulnerabilities in electronic social infrastructure cause physical, real-world harm and severe disruption. Lately, malicious code technology has become more organized and specialized by being combined with various industrial fields, in order to illegally obtain personal information and accomplish political and economical goals through technological hacking attacks on society using tools such as phishing, pharming, adware, and spyware. Furthermore, internet worms and viruses that take advantage of weaknesses in information and communication technology were traditionally used to attack only local PCs, but are now being used to attack information and communication technology infrastructures and services.

Information protection systems with anti-virus products that protect personal information from today's malicious codes are typically based on digital signature certificates. However, a conventional digital signature certificate has a limitation in coping with malicious codes using newer attack technologies.

To resolve this limitation, various malicious code detecting technologies are being developed, and research for malicious code attack detection using unknown anomaly attack detection technologies based on specific behaviors has been actively conducted. The anomaly attack detection technologies based on specific behaviors need to analyze various code behaviors to distinguish malicious behaviors from normal behaviors. However, because code behaviors to be classified generate many behaviors in systems, it is difficult to set guidelines for distinguishing behaviors due to false-positive based on behavior analyzing errors and guideline setting errors.

To reduce the false-positive in the anomaly detecting method, intrusion detection technology using data mining technology has been developed in an intrusion detection field of the late 1990s. However, an anomaly detection technology that is based on all behavior events in execution codes of a system has not been provided until now in the present invention.

To detect unknown malicious codes, Korean Patent Application No. 2002-0013994 discloses a method detecting a write operation of a malicious code to prohibit it or notify a user about it, in order to prevent infection by a computer virus. However, according to Korean Patent Application No. 2002-0013994, when a parasite virus among file viruses tries to attach a virus program to the front or the end of an execution file for infection, the write operation detecting method does not detect all kinds of malicious codes, and only detects a specific virus displaying a limited range of behaviors. Furthermore, Korean Patent Application No. 2006-0063342 discloses a real-time attack pattern detection system for unknown network attacks, which extracts unknown attack patterns limited to a network attack, searches suspicious packets among all packets at the beginning of an input to assign a suspicious indicator to suspicious packets. At this point, many attack patterns may be missed or the suspicious indicator may be assigned to a normal pattern, such that false-positives may actually increase during signature creation.

Like the present invention, Korean Patent Application No. 2004-0056998 discloses a behavior-based malicious code detection technique through execution code observation in a system. However, the suggested technique imposes a predefined risk level score for specific behaviors. For this, an administrator must manually assign risk level scores to specific execution code behaviors.

SUMMARY OF THE INVENTION

Accordingly, the present invention is directed to an anomaly malicious code detecting method and system using the same, which substantially obviate one or more problems due to limitations and disadvantages of the related art.

It is an object of the present invention to provide a malicious pattern detecting method and a system using the same, the method monitoring all behaviors within a system, which are created by normal execution codes, and malicious codes to combine related events, in order to create a specific pattern and input it into a learning algorithm to create a malicious behavior specific value (a prediction pattern). Then, after a behavior feature pattern is made from new execution code, the method detects malicious codes by determining whether a previously-created malicious behavior feature value (a prediction pattern) exists or not in the behavior feature pattern.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a anomaly malicious code detection system using a process behavior prediction technique, including: a DB filtering module performing primary malicious code filtering with respect to execution codes executed in a system; a system resource monitor module monitoring a system resource to collect each event information generated by the execution codes executed in the system; a reprocessing module reprocessing each event information collected in the system resource monitor module to reconstruct it into one integrated log representing a related behavior feature value of the execution codes; a behavior prediction information processing module inputting the integrated log reconstructed in the reprocessing module into a learning algorithm to extract an anomaly malicious behavior feature value (a prediction pattern); and an anomaly malicious behavior detection module comparing the anomaly malicious behavior feature value extracted from the behavior prediction information pressing module with the behavior feature value data constructed in the reprocessing module to detect a malicious behavior.

The system resource monitor module may collect respective event information with respect to file system, process, registry, service, and network items.

The system resource monitor module may include: a file monitor extracting information such as a detection time, a packet identification (PID), a path, whether a system directory exists or not, etc.; an IM monitor extracting information by each packet unit such as a detection time, a PID, a S/D-IP, a packet length, etc.; a process monitor extracting information such as a process detection time, a PID, the number of threads, etc.; a registry monitor extracting information such as a detection time, a PID, a registry path, a current state, a size, etc.; a TDI_P monitor extracting information such as a network information-detection time, a PID, a local IP address, a remote IP address, an average length of a packet, protocol, the number of pieces, a transmission size, a reception size, etc., which are expressed in a process unit through a TDI driver; and a TDI_S monitor extracting information such as a network information-detection time, a PID, a local IP address, a remote IP address, a protocol, a transmission size, a reception size, etc., which are expressed in a session unit through the TDI driver.

The reprocessing module may construct the related behavior feature value data of the execution codes into one record with respect to an event occurrence time while reconstructing the integrated log.

In another aspect of the present invention, there is provided a method of detecting an anomaly malicious code by using a process behavior prediction technique, including the steps of: performing primary malicious code filtering on execution codes executed in a system; performing system resource monitoring to collect each event information generated by the execution codes executed in the system; reprocessing each of the event information collected during the performing of the system resource monitoring to reconstruct one integrated log representing a related behavior feature value of the execution codes; inputting the reconstructed integrated log reconstructed during the reprocessing of each of the event information into a learning algorithm to extract an anomaly malicious behavior feature value (a prediction pattern); and comparing the anomaly malicious behavior feature value extracted during the inputting of the reconstructed integrated log with the behavior feature value data constructed during the reprocessing of the event information to detect malicious behaviors.

The performing of the system resource monitoring may include the step of collecting each event information about file system, process, registry, service, and network items.

The reprocessing of each of the event information further may include the step of constructing the related behavior feature value data of the execution codes into one record with respect to an event occurrence time while reconstructing the integrated log.

The constructing of the one record further may include the step of inserting a value within a recent event effective time range into a record field with no event and inserting a null into a record field when deviant from the recent event effective time range.

The present invention can determine whether codes are malicious or not by searching a malicious behavior feature value (a prediction pattern) based on behaviors of execution codes in a system and then comparing it with a behavior feature value of a new unknown malicious code.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
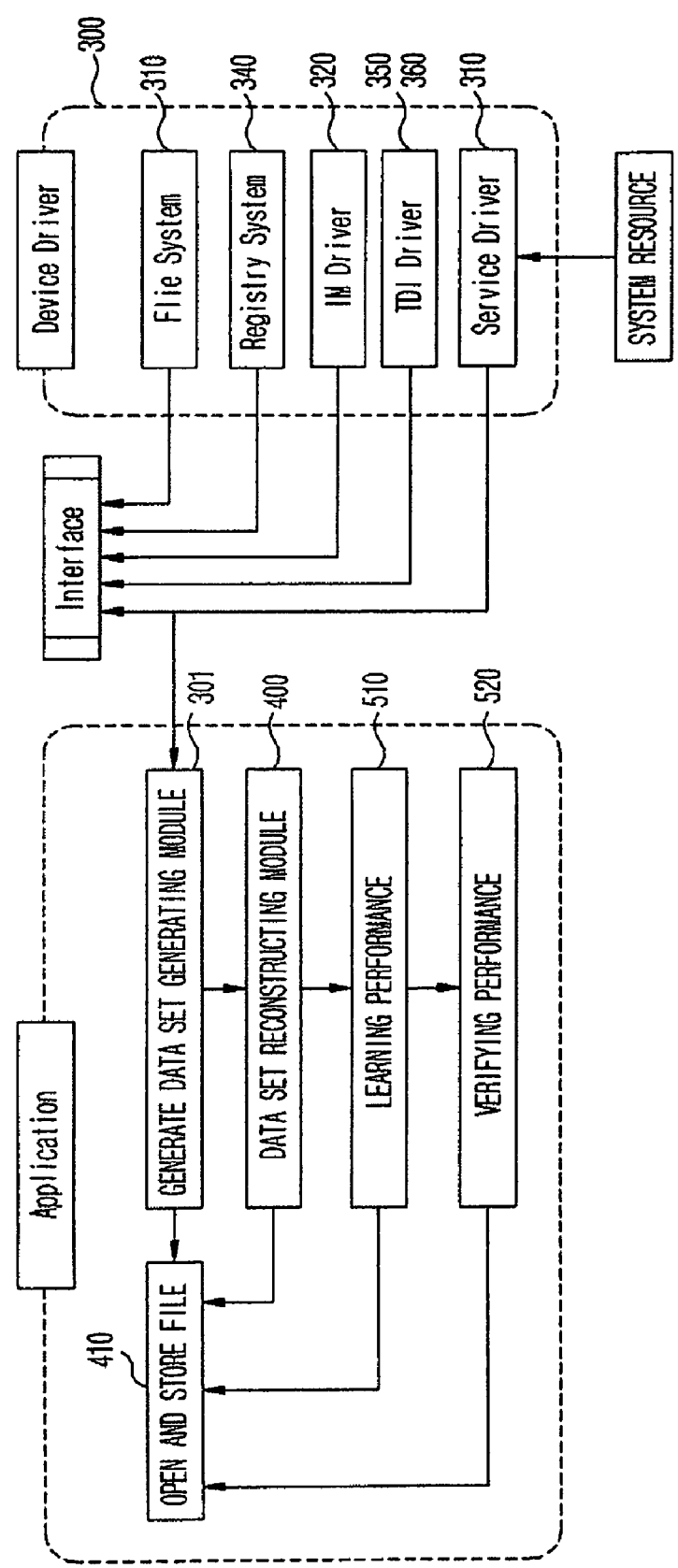
FIG. 1 is a block diagram that conceptually illustrates verification of execution code monitoring, data set generation using the same, learning performance, and learning result.

FIG. 1 is a block diagram that conceptually illustrates verification of execution code monitoring, data set generation using the same, learning performance, and learning result.

As illustrated in FIG. 1, a device driver 300 monitoring a file system, a registry system, a network, a service observes a system resource, and collects respective event logs generated by execution code with respect to each monitor to transmit the event log to a data set generating module 301.

The data set generating module 301 generates a log file with respect to logs transmitted from the device driver 300, and starts a process monitoring thread to monitor whether a process is executed or not.

Additionally, a data set reconstructing module 400 reconstructs log files generated by each device driver 300 into one file and stores it. At this point, one record with 76 fields with respect to a generation packet represents information (a feature value) with respect to a corresponding packet. A corresponding record includes process information, file information, registry information, and network information, and the respectively collected information includes information related to record construction. Such that one record represents a comprehensive behavior event feature value.

This record information is inputted into a data mining algorithm for learning performance in operation 510, and its result value represents a behavior feature value (a prediction value) with respect to corresponding execution code.

This execution code feature value is stored in a file format, and it is determined whether there is malicious code or not by using pattern matching after analyzing a behavior of new execution code in operation 520.

Figure 2:
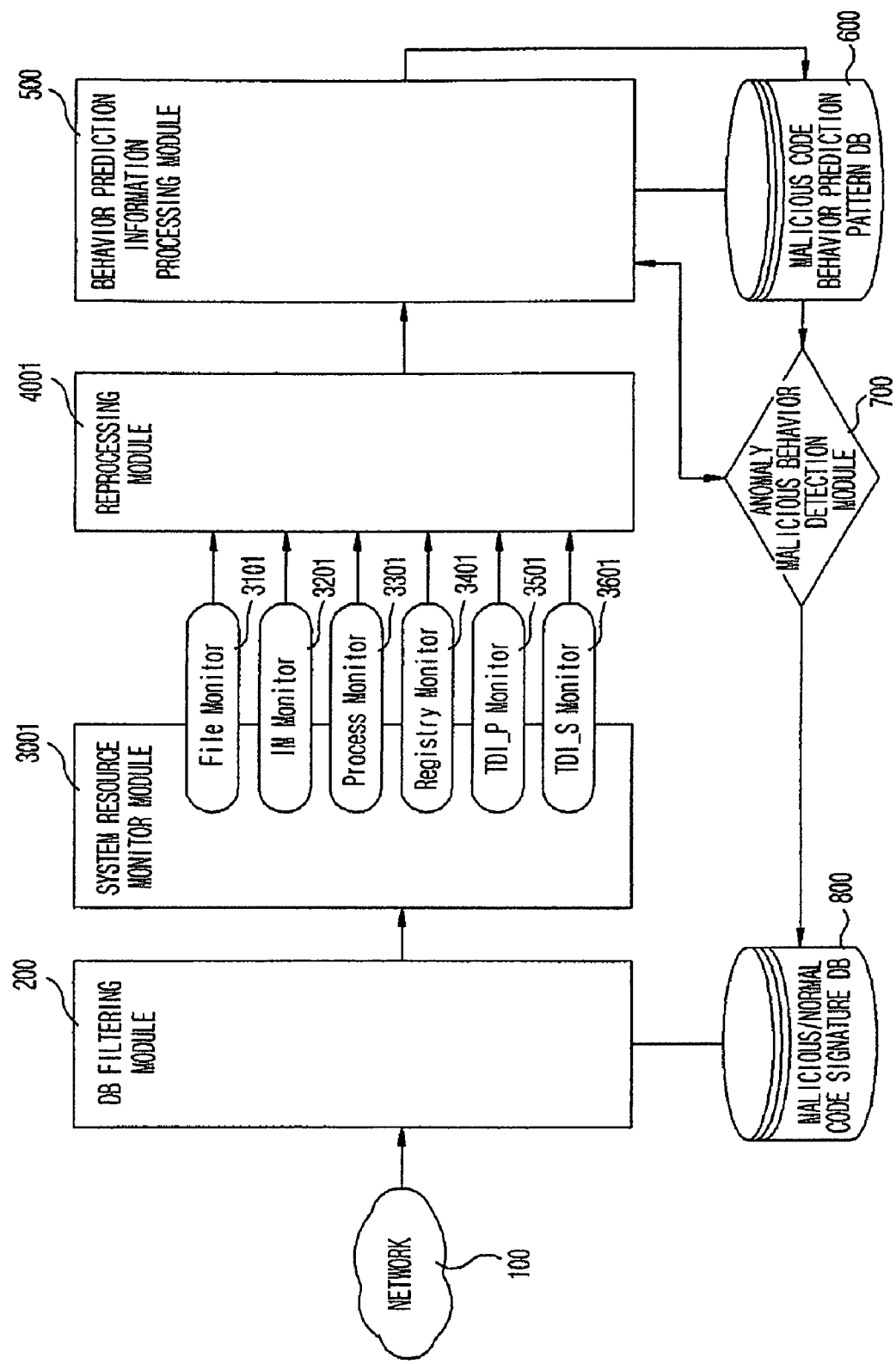
FIG. 2 is a view of an entire structure of a system detecting anomaly malicious code according to an embodiment of the present invention.

FIG. 2 is a view of an entire structure of a system detecting anomaly malicious code according to an embodiment of the present invention.

As illustrated in FIG. 2, execution codes that are downloaded from a network 100 and executed in a system pass through a DB filtering module 200 to filter known malicious codes first. Here, a malicious code signature DB 800 detects known malicious codes first by using filtering technique in pattern matching technique that is identical to a conventional method.

New execution codes passing through the DB filtering module 200 are executed in a system. At this point, each process performs a file reading and writing operation, network packet transmission/reception, a registry reading and writing operation, service registration and execution. To monitor all the above operations, for example, provided is a system resource monitor module 3001 including six monitors 3101, 3301, 3401, 3501, and 3601.

The system resource monitor module 3001 collects an event log about file system, process, registry, service, and network items, and monitors states of currently-running process and thread, and observes accesses of a network, a file system, a registry, a service, and driver based on process information.

A file monitor 3101 extracts information such as a detection time, a packet identification (PID), a path, and whether a directory exists or not. An IM monitor 3201 extracts information such as a detection time, a PID, an S/D-IP, and a packet length in each packet unit.

A process monitor 3301 extracts information such as a process detection time, a PID, the number of threads, and a registry monitor 3401 detects information such as a detection time, a PID, a registry path, a current state, and a size.

A TDI_P monitor 3501 extracts network information expressed by a process unit through a TDI driver, and this information includes a detection time, a PID, a local IP address, a remote IP address, an average length of a packet, a protocol, the number of pieces, a transmission size, a reception size, etc.

Lastly, a TDI_S monitor 3601 extracts network information expressed by a session unit through a TDI driver, and this information includes a detection time, a PID, a local IP address, a remote IP address, a protocol, a transmission size, and a reception size, etc.

This information is stored in a temporary file format by each of six monitors and is reconstructed into one integrated log representing a behavior feature value of a corresponding process in a reprocessing module 4001. (this will be described in more detail with reference to FIG. 4)

The reason for structuring the integrated log of the reprocessing module 4001 is to input one record into the behavior prediction information processing module 500 after structuring event information of the respective monitors detected from each collected log into the one record of related information.

Due to the above operations, the behavior prediction processing module 500 can extracts a malicious behavior feature value (a prediction pattern) from related log information.

The extracted malicious behavior feature value is inputted into a malicious code behavior prediction pattern DB 600. Then, if unknown new code is executed and is not known malicious code, as described above, the new code is monitored by the system resource monitor module 3001 and also compared with the processed corresponding execution code behavior feature value by the reprocessing module 4001, such that it can be determined whether the new code is malicious or not.

Finally, if the new code is malicious, it is inputted into the malicious signature DB 800 after extracting a signature of the corresponding malicious code.

Figure 3:
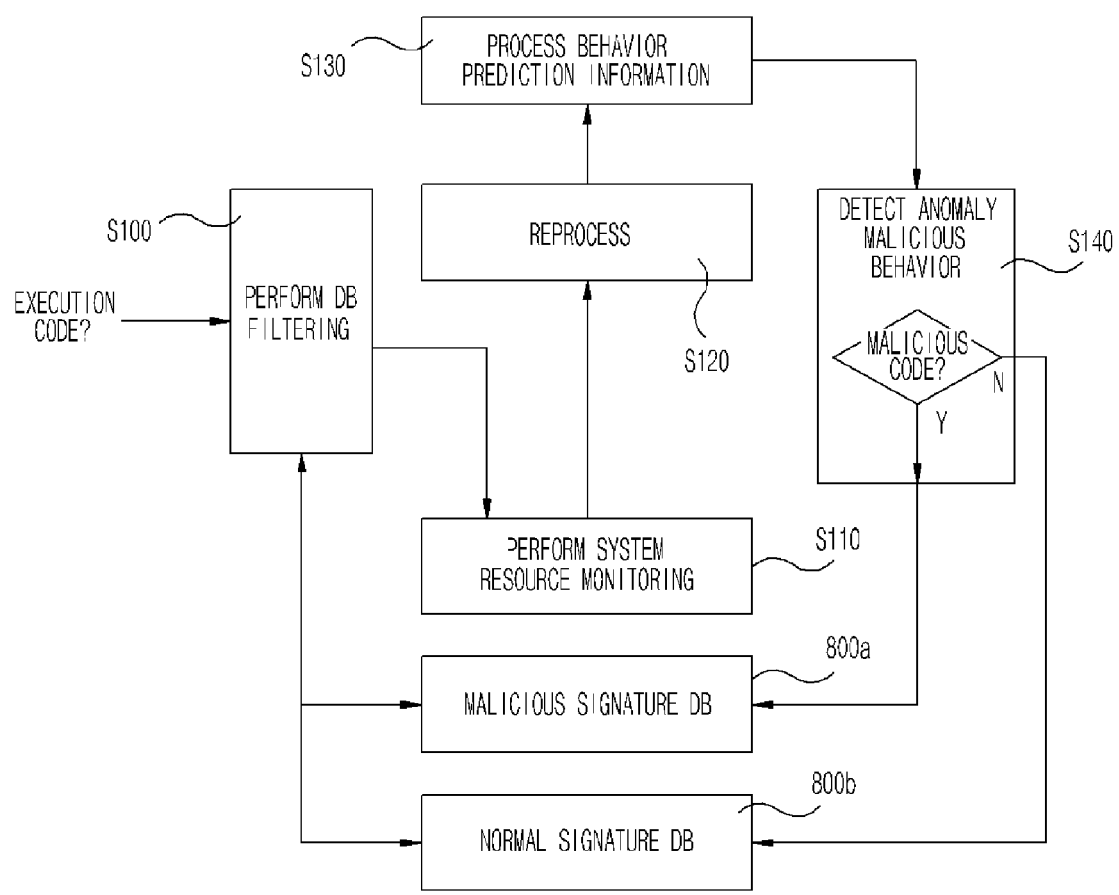
FIG. 3 is a flowchart illustrating a method of filtering malicious code.

FIG. 3 is a flowchart illustrating a method of filtering malicious code:

Firstly, before execution code is executed in a system, it is primarily filtered by DB filtering in operation S100.

The corresponding DB filtering includes a malicious code signature DB 800*a* and a normal signature DB 800*b* and filters known malicious codes before execution. At this point, the well-known normal code is excluded from targets to be monitored in operation S110. As a result, the total load caused by monitoring all execution codes can be reduced.

In operation S110, when new execution code, which is not known normal code and known malicious code, is executed in a system, it is monitored.

Through the system resource monitoring, after collecting a primary temporary log with respect to corresponding execution code, relation formation about the entire log is executed to extract a behavior feature value as a record format at each process in operation S120. This is information that is generated by subdividing the behaviors caused by a corresponding process into information such as a file, a registry, a network, a service, etc., and also represents a behavior of a corresponding process in detail. This information again passes through behavior prediction information processing in operation S130 to learn by using a data mining algorithm, such that a feature value (a prediction pattern) is shown from the overall detailed behavior feature.

Lastly, this behavior feature value as an actual malicious code detection policy detects a behavior of execution code with a behavior feature value as a malicious behavior in operation S140.

Figure 4:
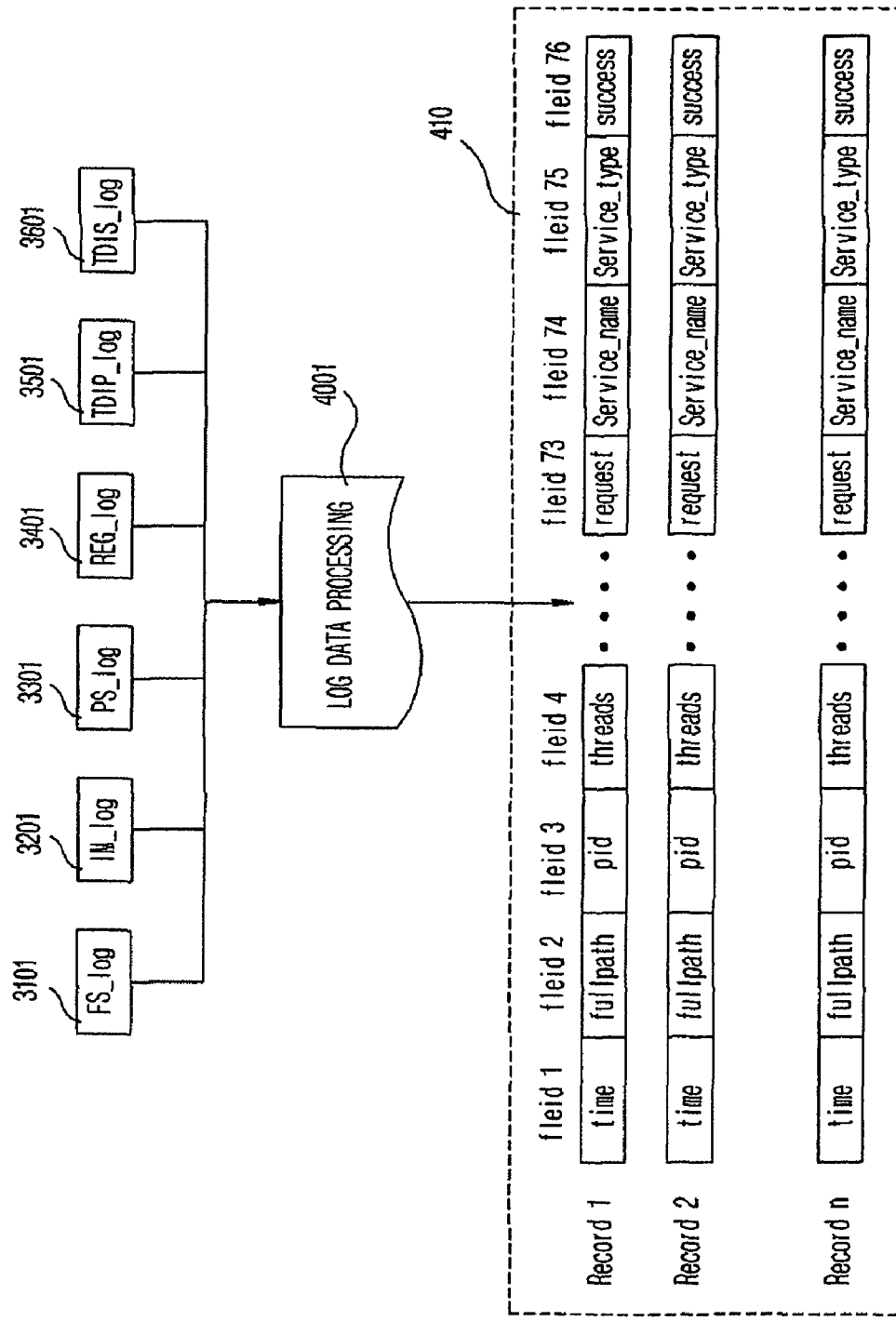
FIG. 4 is a view of an integrated log data generated by a reprocessing module of FIG. 2.

FIG. 4 is a view of an integrated log data generated by the reprocessing module of FIG. 2.

In the reprocessing module 4001 of FIG. 2, 76 data created by the file monitor 3101, the IM monitor 3201, the process monitor 3301, the registry monitor 3401, the TDI_P monitor 3501, and the TDI_S monitor 3601 are integrated into one record. This record is classified by each generation process to create an integrated log file 410.

First, the log generated by each monitor is stored in a temporary file that combines time and name of each module.

When the log collection is finished, log data of each temporary file collected by each monitor is integrated into one DB file, and the contents of several fields are filled by calculation to create one record.

When forming information using one record, the module with the most events in one second becomes the reference module.

When the recorded data is created as one record, this is represented by one second. That is, if the time is between 2.500000 and 3.499999, this is represented as three seconds.

Additionally, when attaching information generated in remaining modules to the standard information, a value of field with no event is filled with a value within a recent event effective time range, and if not, is filled with null.

That is, when it is assumed that a file system creates 100 events during one second and a registry event creates 50 events, a log includes the total 100 records. Insufficient 50 registry events record a previous value within the recent event effective time range. Here, the recent effective time sets a range of effective time when recording the previous event value, and also is inputted by a user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An anomaly malicious code detection system using a process behavior prediction technique, comprising:

a DB filtering module configured to perform primary malicious code filtering with respect to execution codes executed in a target system;

a system resource monitor module operated by a processor device and configured to monitor a plurality of system resources to collect information of events that are generated by the execution codes executed in the target system, the collected event information being in the form of a plurality of resource logs corresponding to the plurality of system resources;

a reprocessing module configured to reprocess the collected event information to construct, from the collected event information, one integrated log representing a related behavior feature value of the execution codes, the integrated log having a plurality of records, each of the records representing an event and including a portion of the resource logs which corresponds to the event;

a behavior prediction information processing module configured to input the constructed integrated log into a learning algorithm to extract a malicious behavior feature value as a prediction pattern; and an anomaly malicious behavior detection module configured to compare the extracted malicious behavior feature value with a related behavior feature value that is constructed in the reprocessing module to detect a malicious behavior, wherein the system resources are file system, process, registry, service, and network items, and the system resource monitor module comprises:
  a file monitor configured to extract information, including a detection time, a packet identification (PID), a path, and whether a system directory exists or not;
  an IM monitor configured to extract information by each packet unit, including a detection time, a PID, a S/D-IP, and a packet length;
  a process monitor configured to extract information, including a process detection time, a PID, and the number of threads;
  a registry monitor configured to extract information, including a detection time, a PID, a registry path, a current state, and a size;
  a TDI_P monitor configured to extract information, including a network information-detection time, a PID, a local IP address, a remote IP address, an average length of a packet, protocol, the number of pieces, a transmission size, and a reception size, which are expressed in a process unit through a TDI driver; and
  a TDI_S monitor configured to extract information, including a network information-detection time, a PID, a local IP address, a remote IP address, a protocol, a transmission size, and a reception size, which are expressed in a session unit through the TDI driver.

2. The system of claim 1, wherein the reprocessing module constructs each record of the integrated log with respect to an event occurrence time.

3. The system of claim 1, wherein the DB filtering module is configured to perform primary malicious code filtering by extracting a code signature from the execution codes and determining whether the extracted code signature is found in a malicious code signature DB and whether the extracted code signature is found in a normal code signature DB.

4. The system of claim 3, wherein the system resource monitor module is configured to monitor the plurality of system resources to collect information of events that are generated by the execution codes when it is determined that the extracted code signature is not found in the malicious code signature DB and is not found in the normal code signature DB.

5. The system of claim 3, wherein the extracted code signature is stored in the malicious code signature DB when any malicious behaviors are detected based on a result of the comparison between the extracted malicious behavior feature value and the related behavior feature value.

6. A method of detecting an anomaly malicious code by using a process behavior prediction technique, comprising the steps of:
  performing primary malicious code filtering on execution codes executed in a system;
  monitoring a plurality of system resources to collect information of events that are generated by the execution codes executed in the system, the collected event information being in the form of a plurality of resource logs corresponding to the plurality of system resources;
  reprocessing the collected event information to construct, from the collected information, one integrated log representing a related behavior feature value of the execution codes, the integrated log having a plurality of records, each of the records representing an event and including a portion of the resource logs which corresponds to the event;
  inputting the constructed integrated log into a learning algorithm to extract a malicious behavior feature value as a prediction pattern; and
  comparing the extracted malicious behavior feature value with a related behavior feature value that is constructed during the reprocessing of event information, to detect malicious behaviors, wherein
  the system resources are file system, process, registry, service, and network items, and
  the step of monitoring the plurality of system resources comprises the steps of:
    extracting by a file monitor, information including a detection time, a packet identification (PID), a path, and whether a system directory exists or not;
    extracting by an IM monitor, information by each packet unit, including a detection time, a PID, a S/D-IP, and a packet length;
    extracting by a process monitor, information including a process detection time, a PID, and the number of threads;
    extracting by a registry monitor, information including a detection time, a PID, a registry path, a current state, and a size;
    extracting by a TDI_P monitor, information including a network information-detection time, a PID, a local IP address, a remote IP address, an average length of a packet, protocol, the number of pieces, a transmission size, and a reception size, which are expressed in a process unit through a TDI driver; and
    extracting by a TDI_S monitor, information including a network information-detection time, a PID, a local IP address, a remote IP address, a protocol, a transmission size, and a reception size, which are expressed in a session unit through the TDI driver.

7. The method of claim 6, wherein the reprocessing of the collected event information further comprises the step of constructing each record of the integrated log with respect to an event occurrence time.

8. The method of claim 7, wherein the constructing of each record further comprises the step of inserting into a record field with no value in a record of a particular event, a value in a record of a previous event, if the previous event has occurred within a recent event effective time range from the particular event, and inserting, if the previous event has occurred before within the recent event effective time range from the particular event, a null value into the record field with no value.

9. The method of claim 6, wherein the step of performing primary malicious code filtering includes:
extracting a code signature from the execution codes and determining whether the extracted code signature is found in a malicious code signature DB and whether the extracted code signature is found in a normal code signature DB.

10. The method of claim 9, wherein the plurality of system resources are monitored to collect information of events that are generated by the execution codes when it is determined that the extracted code signature is not found in the malicious code signature DB and is not found in the normal code signature DB.

11. The method of claim 9, further comprising:
storing the extracted code signature in the malicious code signature DB when any malicious behaviors are detected based on a result of the comparison between the extracted malicious behavior feature value and the related behavior feature value.

* * * * *